US011850912B2

(12) United States Patent
Heering

(10) Patent No.: US 11,850,912 B2
(45) Date of Patent: Dec. 26, 2023

(54) AIR CONDITIONING MODULE, MODULAR AIR CONDITIONING SYSTEM, TRANSPORT VEHICLE AND METHOD

(71) Applicant: WHITE PELICAN B.V., Apeldoorn (NL)

(72) Inventor: Patrick Heering, Vaassen (NL)

(73) Assignee: White Pelican B.V.

( * ) Notice: Subject to any disclaimer, the term of this patent is extended or adjusted under 35 U.S.C. 154(b) by 46 days.

(21) Appl. No.: 17/595,715

(22) PCT Filed: May 19, 2020

(86) PCT No.: PCT/EP2020/063970
§ 371 (c)(1),
(2) Date: Nov. 23, 2021

(87) PCT Pub. No.: WO2020/234298
PCT Pub. Date: Nov. 26, 2020

(65) Prior Publication Data
US 2022/0250434 A1 Aug. 11, 2022

(30) Foreign Application Priority Data
May 23, 2019 (NL) ..................... 2023182

(51) Int. Cl.
*B60H 1/00* (2006.01)
*B60H 1/32* (2006.01)
(52) U.S. Cl.
CPC ....... *B60H 1/00542* (2013.01); *B60H 1/3229* (2013.01); *B60H 1/3232* (2013.01)

(58) Field of Classification Search
CPC . B60H 1/00542; B60H 1/3229; B60H 1/3232
See application file for complete search history.

(56) References Cited

U.S. PATENT DOCUMENTS

| 5,129,235 A | 7/1992 | Renken et al. |
| 6,763,669 B1 * | 7/2004 | Bushnell ............ B60H 1/00371 62/115 |

(Continued)

FOREIGN PATENT DOCUMENTS

| DE | 102014016939 A1 * | 5/2016 | ........... B60H 1/3226 |
| DE | 102014016939 A1 | 5/2016 | |

OTHER PUBLICATIONS

DE-102014016939-A1 Translation (Year: 2016).*

*Primary Examiner* — David J Teitelbaum
(74) *Attorney, Agent, or Firm* — Lerner David LLP

(57) ABSTRACT

The invention relates to an air conditioning module, a modular air conditioning system, a transport vehicle and a method. The air conditioning module the air conditioning module (51) comprises an evaporator (65), a condenser (66) and a compressor (67) which are mounted to, onto or in the frame (60). The frame (60) further defines or bounds a first volume V1 that is arranged in air communication with the evaporator (65) and a second volume V2 that is arranged in air communication with the condenser (66). The second volume V2 is separated from the first volume VI, at least in the lateral direction T. The frame (60) is provided with one or more walls (71), (72), (73), (74) to at least partially define or bound the first volume V1 and the second volume V2. The first volumes V1 are aligned in the stacking direction S to form the continuous first air channel C1.

33 Claims, 9 Drawing Sheets

(56) References Cited

U.S. PATENT DOCUMENTS

| | | | |
|---|---|---|---|
| 6,763,670 B1 | 7/2004 | Bushnell et al. | |
| 2010/0132390 A1* | 6/2010 | Platt | F25B 29/003 |
| | | | 62/238.7 |
| 2011/0113801 A1 | 5/2011 | Rajasekaran et al. | |
| 2012/0244015 A1* | 9/2012 | Benson | F24F 7/06 |
| | | | 417/3 |
| 2012/0297811 A1* | 11/2012 | Miglio | F24F 3/08 |
| | | | 62/324.1 |

\* cited by examiner

AIR CONDITIONING MODULE, MODULAR AIR CONDITIONING SYSTEM, TRANSPORT VEHICLE AND METHOD

CROSS-REFERENCE TO RELATED APPLICATIONS

This is a National Phase Application filed under 35 U.S.C. § 371 as a national stage of PCT International Application No. PCT/EP2020/063970, filed on May 19, 2020, an international patent application claiming the benefit of Netherlands Application No. 2023182, filed on May 23, 2019, the content of each of which is hereby incorporated by reference in its entirety.

BACKGROUND

The invention relates to an air conditioning module, a modular air conditioning system, a transport vehicle and a method for conditioning air in a transport vehicle.

U.S. Pat. No. 6,763,670 B1 discloses a modular rooftop air conditioning system for a bus, made up of one or more self-contained modules having one or more evaporator sections and one or more condenser sections. The modules may be of a single unit configuration with a single condenser section and a single evaporator sections or they may be of a double unit configuration have two condenser sections and two evaporator sections. The total capacity requirements are met by combining the use of single units and double unit configuration, with each of the evaporator sections within a module communicating with a single return air opening and a single supply air opening. The modules are operated independently from each other.

DE 10 2014 016 939 A1 discloses a refrigeration system for a transport vehicle, comprising a plurality of identical modules arranged side-by-side. Each module is provided with its own supply fan for taking in outside air and feeding said air into the respective module. In one embodiment the refrigeration system features a common return duct that branches into distinct, separate ducts supplying air to each module individually, i.e. in parallel.

SUMMARY OF THE INVENTION

A disadvantage of the known modular rooftop air conditioning system according to U.S. Pat. No. 6,763,670 B1 is that each module has its own fresh air intake openings at the top of the module and several supply air conduits at the bottom of the module to communicate the air to the supply air inlets of the bus. In other words, the modules do not cooperate to take in air through a common fresh air inlet or via a common return air conduit duct. The modules are mounted one after the other along the centerline of the bus so as to operate independently and not interfere with each other's air flow. It is only after the entry of the conditioned air into the bus, that the independent air flows are joined.

Hence, although the known modules allow for expanding the air conditioning capacity, the flexibility of the known air conditioning system is limited to the amount and positioning of the air conditioning openings in the rooftop. Expanding the capacity beyond the original air conditioning infrastructure of the bus requires significant modification, i.e. the creation of additional air supply openings, air return openings and conduits to process the additional air flow. Moreover, the amount of modules that can be combined is limited by the surface area of the rooftop.

Additionally, the known double unit configuration has the disadvantage that when one of the units fails, the entire module has to be replaced.

Finally, the known modules are not easily exchanged as they have to be securely mounted to the rooftop of the bus with appropriate fasteners and connected correctly to the various openings and electrical connectors. Hence, maintenance activities and/or changes to capacity can be time consuming.

A disadvantage of the known refrigeration system according to DE 10 2014 016 939 A1 is that the modules are connected to the air supply in parallel. Consequently, each module needs to be individually mated with or coupled to its own supply fan and/or to an individual branch of a common air return duct. The known refrigeration system is designed to receive three identical modules. Even if it has the space to receive more modules, one cannot simply add the modules and expect the known refrigeration system to work. Instead, additional supply fans need to be installed and/or the common air return duct needs to be branched off into more separate ducts. In other words, the air supply configuration and/or air discharge configuration of the refrigeration system as a whole needs to be redesigned to expand the flexibility of the known refrigeration system.

It is an object of the present invention to provide an air conditioning module, a modular air conditioning system, a transport vehicle and a method for conditioning air in a transport vehicle, wherein the flexibility of the air conditioning can be improved.

According to a first aspect, the invention provides an air conditioning module comprising a frame and, mounted to said frame, an evaporator, a condenser and a compressor which are interconnected to form a closed circuit for a heat exchange fluid, wherein the frame further defines a first volume arranged in air communication with the evaporator and a second volume, separate from the first volume, arranged in air communication with the condenser, wherein the frame is provided with a first opening and a second opening in a stacking direction on opposite sides of the first volume, wherein the first volume forms a part of a continuous first air channel extending in the stacking direction into the frame through the first opening and out of the frame through the second opening without passing through the evaporator.

The air conditioning module according to the invention can thus be used in a stack of similar or identical air conditioning modules to form the continuous first air channel extending through all of the air conditioning modules without passing through any the respective evaporators thereof. The continuous first air channel is 'continuous' in the sense that the air flow is not interrupted by the frame of the air conditioning module in the stacking direction. Instead, the first volume can freely communicate, through the respective openings and without passing through the evaporator, with the first volumes of the similar or identical air conditioning modules stacked in said stacking direction onto the claimed air conditioning module. Hence, said continuous first air channel can be used as a common air supply channel or as a common air discharge channel for all of the air conditioning modules depending on the direction of the air flow. A single airflow can flow in series through the subsequent first volumes of all the air condition modules in the stack. Hence, only one air inlet is required to supply air to or draw air from all of the air conditioning modules. Consequently, the complexity of the resulting air conditioning system can be reduced considerably and its capacity can be expanded or reduced easily by adding or removing air conditioning modules from the stack. Moreover, by stacking a plurality of the air conditioning modules in the stacking direction on top of each other, more air conditioning modules can be fitted on a relatively small footprint.

In other words: each air condition module according to the invention provides its own closed circuit for the heat exchange fluid that is contained within the frame of the air conditioning module, while the first volume forms a part of the continuous first air channel that is created by stacking identical air condition modules in the stacking direction. In contrast, in DE 10 2014 016 939 A1, the common return duct is not the result of interconnecting volumes in the stacking direction through openings on opposite sides in the frames of the modules. Instead, the common return duct of DE 10 2014 016 939 A1 is only common in the part that feeds the air back from the transport compartment to the refrigeration system. Within the refrigeration system the common return duct branches of into distinct, individual ducts that communicate with the modules individually, i.e. in parallel. Hence, each module requires its own branch and, as a result, the number of modules that can be accommodated is restricted by the number of branches of the return duct.

It will be appreciated that in the air conditioning module according to the present invention, where the frame is conveniently provided with a first opening and a second opening in a stacking direction on opposite sides of the first volume, the continuous first air channel can be formed by the air conditioning modules themselves by simply stacking a chosen number of air conditioning modules in said stacking direction, independently of the configuration of the air inlets and the air outlets of the air conditioning system. This significantly increases the flexibility when choosing the number of air conditioning modules that are to be combined.

In a preferred embodiment the second opening is a projection of the first opening in a direction parallel to the stacking direction. Hence, when stacking a plurality of similar or identical air conditioning modules, the first opening of one of the air conditioning modules can be properly aligned with the second opening of another one of the air conditioning modules so as to the form the continuous first air channel.

Additionally or alternatively, the frame has a top and a bottom opposite to the top in the stacking direction, wherein the first opening is located in the top of the frame and the second opening is located in the bottom of the frame, wherein the top and the bottom are parallel or substantially parallel at the location of the first opening and the second opening, respectively. Again, when stacking a plurality of similar or identical air conditioning modules, the bottom of one of the air conditioning modules can be placed in parallel and/or in close proximity to the top of another one of the air conditioning modules so as to the form the continuous first air channel.

In a further embodiment, the evaporator is mounted to the frame at a side of the first volume in a first branch-off direction perpendicular to the stacking direction. Hence, it can be prevented that the evaporator interferes with the common air flow in the continuous first air channel. In other words, the main part of the air flow continuous through the continuous first air channel while only a small part of the air flow is branched-off via the evaporator of the respective air conditioning module.

In a further embodiment, the frame is provided with one or more walls that extend from the first opening up to the second opening and that at least partially define the first volume in one or more directions different from the first branch-off direction and the stacking direction. The one or more walls may contribute to enclosing the common air flow in the continuous first air channel. In other words, the one or more walls, may prevent that air escapes from the continuous first air channel in directions other than the stacking direction and the first branch-off direction.

In particular, the first volume and the second volume are adjacent to each other in a lateral direction perpendicular to the stacking direction, wherein the one or more walls comprises a first separation wall extending between the first volume and the second volume in said lateral direction. More in particular, the first volume and the compressor are adjacent to each other at a side of the first volume in the lateral direction opposite to the first separation wall, wherein the one or more walls comprises a second separation wall extending between the first volume and the compressor. In this way it can be prevented that air escapes from the continuous first air channel into the second volume and/or to the side of the compressor.

Alternatively, the frame extends in a module plane perpendicular to the stacking direction and has a perimeter in said module plane, wherein the one or more walls comprises one or more separation walls extending at least at the sides of the first volume that do not adjoin with the perimeter in the module plane. This embodiment relies on an embodiment of the air conditioning system which will be discussed later, which features a docking rack with one or more walls that complement the air conditioning module least partially define the first volumes and/or the second volumes thereof. Said one or more walls of the docking rack may be arranged in strategic locations directly along the perimeter of the frame. Hence, there is no need to provide the frame with walls at said strategic locations. The separation walls in the current embodiment only define the first volume where the first volume is not bound by the perimeter of the frame.

In a further alternative embodiment, the one or more walls and the evaporator together form a first air chamber that encloses the first volume in all directions but the stacking direction. In this particular embodiment, the air conditioning module itself is responsible for enclosing the continuous first air channel in the specified directions.

In another embodiment the frame is provided with a third opening and a fourth opening in the stacking direction on opposite sides of the second volume, wherein the second volume forms part of a continuous second air channel extending in the stacking direction into the frame through the third opening and out of the frame through the fourth opening without passing through the condenser. Thus, in a similar way as the first volume, the second volumes of a plurality of similar or identical air conditioning modules, when stacked, can form the continuous first air channel that can be used as a common air discharge channel or as a common air supply channel for all of the air conditioning modules depending on the direction of the air flow.

Preferably, the condenser is mounted to the frame at a side of the second volume in a second branch-off direction perpendicular to the stacking direction. Hence, it can be prevented that the condenser interferes with the common air flow in the continuous second air channel. In other words, the main part of the air flow continuous through the continuous second air channel while only a small part of the air flow is branched-off via the condenser of the respective air conditioning module.

In another embodiment the air conditioning module comprises one or more connectors for connection to an electrical power source and/or a control unit external to the air conditioning module. The air conditioning module can therefore be kept relatively simple. Moreover, the electrical power source and/or the control unit may be shared by several air conditioning modules which can thus be powered and controlled together depending on the configuration of the air conditioning system.

According to a second aspect, the invention provides a set of an air conditioning module according to any one of the aforementioned embodiments and a dummy module to replace said air conditioning module, wherein the dummy module comprises a frame that defines a first volume and a second volume which, when the dummy module replaces the air conditioning module, are in the same position as the first volume and the second volume, respectively, of the air conditioning module, wherein the dummy module further comprises a first air barrier which, when the dummy module replaces the air conditioning module, is in the same position as the evaporator. Preferably, the dummy module further comprises a second air barrier which, when the dummy module replaces the air conditioning module, is in the same position as the condenser.

The first air barrier and/or the second air barrier can block air from flowing out of the continuous first air channel and the continuous second air channel, respectively, as it would in the air conditioning module that the dummy module replaces. In other words, the dummy module can prevent that air escapes from the continuous first air channel or the continuous second air channel at the location of an absent air conditioning module. By having the dummy module in place, the air can be made to continue in the continuous first air channel to the next air conditioning module in the stacking direction.

According to a third aspect, the invention provides a modular air conditioning system comprising one or more air conditioning modules according to any one of the embodiments according to the first aspect of the invention. The modular air conditioning system further comprises a docking rack that defines a plurality of levels, wherein each level is arranged for docking one of the one or more air conditioning modules in a docking position in which the first volume of said one air conditioning module is arranged to be aligned in the stacking direction with the first volume of each air conditioning module received in the docking position at any other level to form the continuous first air channel. Preferably, the second volume of said one air conditioning module in the docking position is arranged to be aligned in the stacking direction with the second volume of each air conditioning module received in the docking position at any other level to form the continuous second air channel.

The docking rack may facilitate the docking of the one or more air conditioning modules in a stacked configuration in which each docked air conditioning module can be easily, accurately and/or correctly positioned in the docking position to form said continuous first air channel and/or said continuous second air channel. In other words, each air conditioning module may be conveniently docked in and removed from a dedicated slot or level so that maintenance or exchange of one or more air conditioning modules can be performed quickly, i.e. with minimum downtime.

Preferably, the plurality of levels comprises at least three levels. Hence, the flexibility and/or capacity of the modular air conditioning system can be increased correspondingly.

In a further embodiment of the modular air conditioning system, each air conditioning module is individually insertable into and removable from a respective one of the docking positions in an insertion direction and a removing direction, respectively. Hence, each air conditioning module can be individually removed for maintenance and/or replaced by another air conditioning module or the aforementioned dummy module.

Preferably, the insertion direction and the removing direction are perpendicular to the stacking direction. Hence, each air conditioning module can be individually removed from the docking rack without removing any one of the other air conditioning modules in the docking rack.

More preferably, the removing direction is opposite to the insertion direction. Hence, each air conditioning module can be inserted into and removed from the docking rack from the same side of said docking rack. Hence, the far side of the docking rack with respect to the insertion direction may be conveniently provided with an end wall and/or connectors for connection to an electrical power source and/or a control unit.

Most preferably, each air conditioning module has a first end facing in the insertion direction and a second end facing in the removing direction, wherein each air conditioning module further has a width in a width direction perpendicular to the insertion direction and the stacking direction that is largest at the second end and equal or smaller in the rest of the air conditioning module from the second end towards the first end. In particular, the width at the rest of the air conditioning module may be smaller than the width of the air conditioning module at the second end. Hence, the air conditioning module can be easily removed from the docking rack in the removal direction through an opening in said docking rack that has a width corresponding to the width at the second end.

As discussed earlier, in a further embodiment of the modular air conditioning system, the docking rack comprises one or more walls that at the respective levels complement the one or more air conditioning modules in the docking positions to at least partially define the first volumes and/or the second volumes thereof. Hence, the air conditioning modules do not necessarily require walls where the first volume and/or the second volume adjoin the perimeter of the frame.

In a further embodiment of the modular air conditioning system, the docking rack has an output side for connecting the one or more air conditioning modules to an air distribution section, wherein the output side is provided with one or more output openings which are arranged to be in air communication with the air distribution section and with the evaporators of the one or more air conditioning modules from a side of the respective evaporators opposite to the respective first volumes. Hence, the air branched-off from the common air flow in the continuous first air channel can be drawn through the respective evaporator and via the one or more output openings into the air distribution section.

In a further embodiment of the modular air conditioning system, the docking rack comprises one or more connectors at each level, wherein each air conditioning module comprises one or more connectors that are arranged to be connected automatically to the one or more connectors at a respective one of the levels when the respective air conditioning module is docked in the docking position at said one level. In particular, the one or more connectors of the air conditioning module may be aligned with and/or directly opposite to the one or more connectors of the docking rack at the respective level to automatically interface with each other upon insertion, i.e. in the aforementioned insertion direction. Consequently, the air conditioning modules may operate as cassettes or cartridges that can be conveniently pushed into the docking rack into the docking position and which do not require any additional electrical or electronic connection steps.

In a further embodiment of the modular air conditioning system, the modular air conditioning system further comprises a control unit that is connectable to the one or more air conditioning modules when they are docked at one of the levels of the docking rack to control the operation of said one or more air conditioning modules. Preferably, the control unit is arranged for controlling the one or more air conditioning modules in parallel, redundantly or a combination thereof when two or more air condition modules are docked to the docking rack at the same time. The control unit can control the air conditioning modules depending on the amount of docked air conditioning modules, the type of the docked air conditioning modules, the ambient conditions, the air conditions and/or other parameters. By operating the air conditioning modules in parallel, the capacity of the modular air conditioning system can be increased considerably. By operating two or more air conditioning modules redundantly, one can take over the operation of the other when there is a failure to at least partially maintain the air conditioning functionality.

According to a fourth aspect, the invention provides a transport vehicle comprising a modular air conditioning system according to any one of the aforementioned embodiments according to the third aspect of the invention and a compartment to be conditioned by said modular air conditioning system. Preferably, the transport vehicle is a truck or a trailer for transporting livestock, in particular day-old chicks.

Said vehicle comprises the aforementioned modular air conditioning system with at least one of the aforementioned air conditioning modules, and thus has the same technical advantages as the previously discussed embodiments of the invention.

Preferably, the transport vehicle further comprises an air supply section that is arranged in air communication with the continuous first air channel for supplying air to said continuous first air channel, wherein the air supply section is provided with an air inlet to take in ambient air from outside of the transport vehicle, an air outlet to discharge air out of the transport vehicle and a recirculation channel that is arranged in air communication with the compartment, wherein the air supply section further comprises an air flow selector that is movable between a discharge position in which air recirculated through the recirculation channel into the air supply section is directed through the air outlet and a recirculation position in which the air recirculated through the recirculation channel into the air supply section is at least partially directed into the continuous first air channel. By controlling the position of the air flow selector, the ratio between the recirculated air and the fresh ambient air can be controlled depending on the ambient and/or compartment conditions.

In a further embodiment the transport vehicle further comprises an air distribution section between the modular air conditioning system and the compartment and an air distribution cabinet mounted in said air distribution section to distribute air from the modular air conditioning system into the compartment, wherein the air distribution cabinet is interchangeable with one or more alternative air distribution cabinets. The air distribution cabinets may feature different designs that distribute air in a different way into the compartment.

According to a fifth aspect, the invention provides a method for conditioning air in a transport vehicle according to any one of the aforementioned embodiments according to the fourth aspect of the invention, wherein the method comprises the steps of:
  docking one of the one or more air conditioning modules in the docking position of a respective one of the levels;
  docking a further one of the one or more air conditioning modules in the docking position of any other one of the levels; and
  forming the continuous first air channel with the first volumes of said one air conditioning module and said further air conditioning module.

The method relates to the practical implementation of the aforementioned transport vehicle with its modular air conditioning system and the air conditioning modules and thus has the same technical advantages as the previously discussed embodiments of the invention.

In a preferred embodiment the method further comprises the step of replacing one or more of the one or more air conditioning modules with a dummy module, wherein the dummy module comprises a frame that defines a first volume and a second volume which, when the dummy module replaces the air conditioning module, are in the same position as the first volume and the second volume, respectively, of the air conditioning module, wherein the dummy module further comprises a first air barrier which, when the dummy module replaces the air conditioning module, is in the same position as the evaporator.

In another embodiment the method further comprises the step of controlling the one or more air conditioning modules in parallel, redundantly or a combination thereof when two or more air condition modules are docked to the docking rack at the same time.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
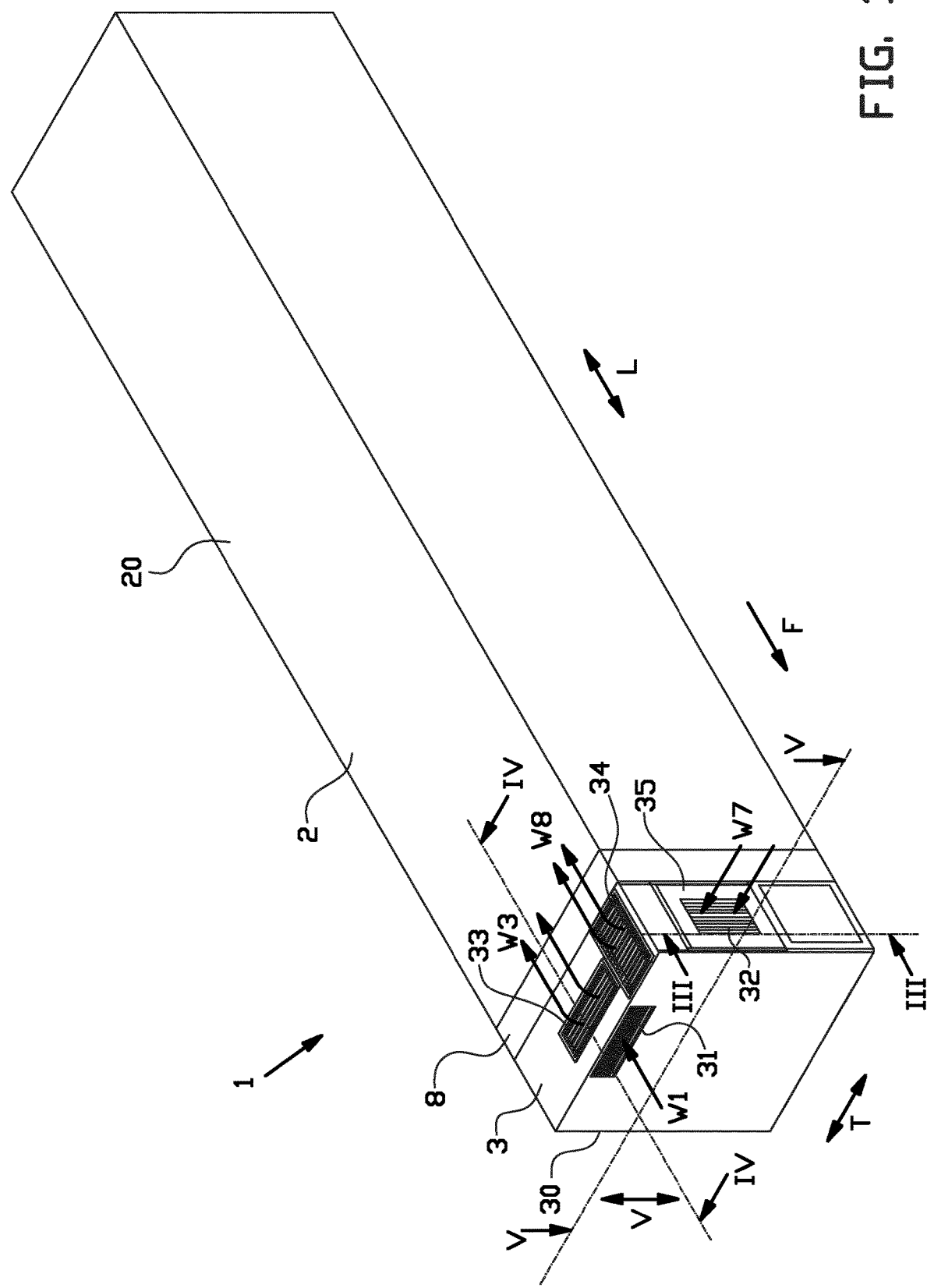
FIG. 1 shows an isometric view of a part of a transport vehicle comprising a compartment and a modular air conditioning system according to the invention.

FIG. 1 shows a part of a transport vehicle 1, in particular the body of a truck or a trailer. The transport vehicle 1 comprises a compartment 2, a modular air conditioning system 3 and an air distribution section 8 between the modular air conditioning system 3 and the compartment 2. In this exemplary embodiment, the compartment 2 is used to transport livestock, in particular day-old chicks, in a manner known per se.

The transport vehicle 1 has a forward driving direction F. The compartment 2 has an elongate, box-shaped body 20 extending in a longitudinal direction L parallel to said forward driving direction F. The transport vehicle 1 further has a horizontal, lateral and/or transverse direction T perpendicular to the longitudinal direction L and a vertical or substantially vertical direction V perpendicular to the longitudinal direction L and the lateral direction T. The compartment 2 has one end in the longitudinal direction L that is connected to the air distribution section 8 to receive air from and return air to the modular air conditioning system 3 via said air distribution section 8. The modular air conditioning system 3 is located at the opposite side of the air distribution section 8 with respect to the compartment 2. In other words, the air distribution section 8 is arranged in air communication with the compartment 2 at one side and the modular air conditioning system 3 at the other side.

Figure 3:
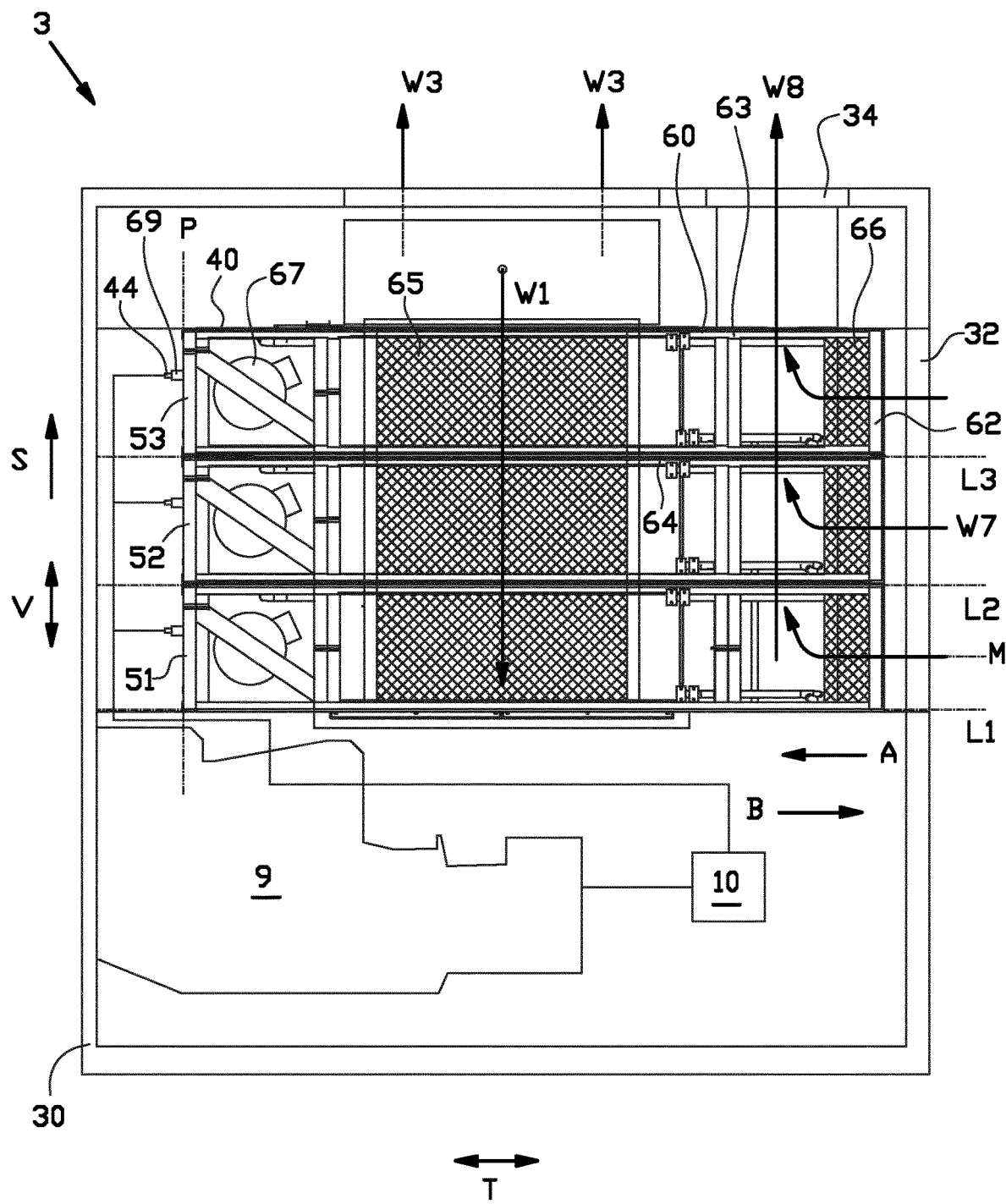
FIGS. 3, 4 and 5 show cross section views of the modular air conditioning system according to line III-III, line IV-IV and line V-V, respectively, in FIG. 1.

As shown schematically in FIG. 3, the modular transport vehicle 1 further comprises a generator 9 for powering the modular air conditioning system 3 and a control unit 10 for controlling the modular air conditioning system 3. The generator 9 and/or the control unit 10 may be operationally connected to the modular air conditioning system 3 or may be provided as part of the modular air conditioning system 3.

As shown in FIGS. 2-5, the modular air conditioning system 3 comprises a housing 30 that connects to the air distribution section 8. The housing 30 of the modular air conditioning system 3 may optionally be continuous with the housing 20 of the compartment 2. The housing 30 is provided with a plurality of air inlets 31, 32 and a plurality of air outlets 33, 34. The housing 30 further comprises an access panel 35 to provide access to the inside of the housing 30. In this exemplary embodiment, one of the air inlets 32 is provided in the access panel 35.

Figure 4:
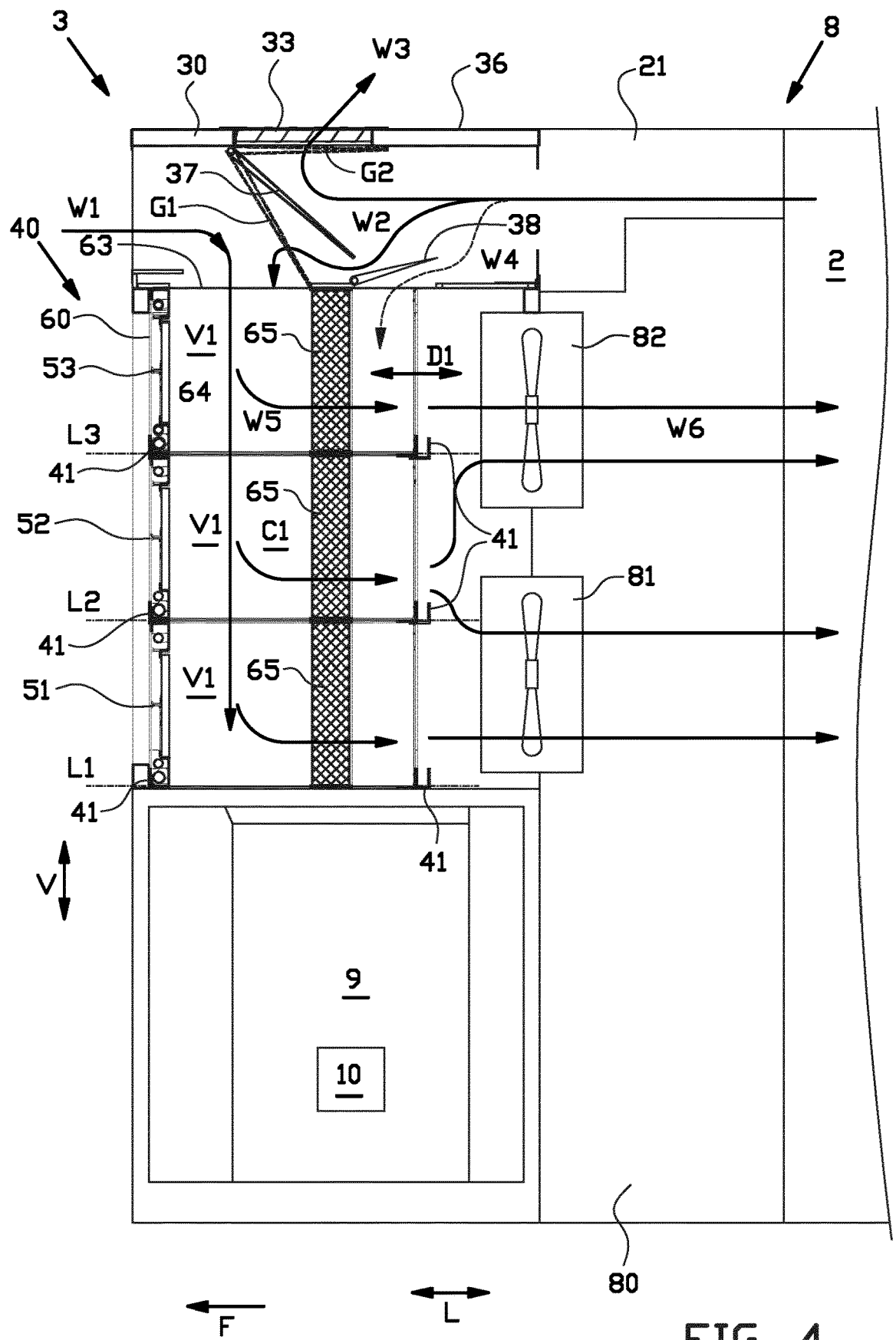

As shown in FIG. 4, the modular air conditioning system 3 further comprises an air supply section 36 that communicates with or comprises one of the plurality of air inlets 31. The air supply section 36 further communicates with or comprises one of the plurality of air outlets 33. Optionally, the compartment 2 may be provided with a recirculation channel 21 to recirculate at least a part of the used air back to the modular air conditioning system 3. The air supply section 36 is provided with an air flow selector 37 to select between and/or mix the recirculated air from the recirculation channel 21 and the fresh air drawn in via said one air inlet 31, as schematically shown with air flow arrow W1. The air supply section 36 further comprises a bypass selector 38 that can direct at least a part of the recirculated air back into the compartment 2 without passing through the modular air conditioning system 3.

In this exemplary embodiment, the air supply section 36 is a part of the modular air conditioning system 36. Alternatively, the air supply section 36 may be a part of the compartment 2 or the transport vehicle 1 as a whole.

As shown in FIGS. 2-5, the modular air conditioning system 3 further comprises a plurality of air conditioning modules 51, 52, 53 and a docking rack 40 inside the housing 30 for receiving and/or docking said plurality of air conditioning modules 51-53. In particular, the docking rack 40 defines a plurality of levels L1, L2, L3 stacked or superimposed in a stacking direction S. In this exemplary embodiment, the stacking direction S is parallel or substantially parallel to the vertical direction V. Each level L1-L3 is arranged for receiving and/or docking one of the plurality of air conditioning modules 51-53 in a docking position P inside the docking rack 40. In this exemplary embodiment, the number of levels 51-53 is three. However, it will be clear that in an alternative embodiment, the number of levels may be chosen differently, i.e. more than three levels or less than three levels.

Figure 2:
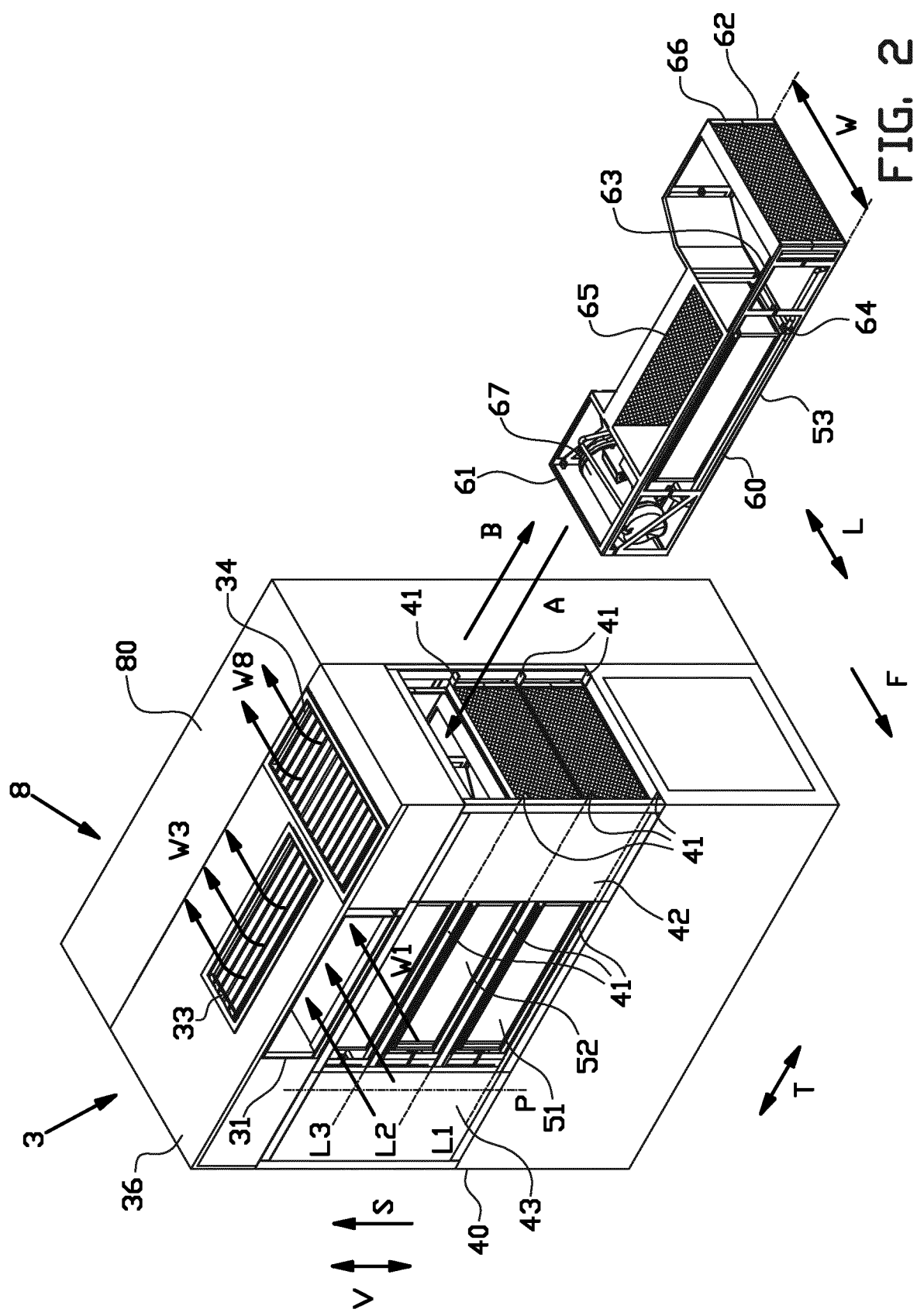
FIG. 2 shows an isometric view of the modular air conditioning system according to FIG. 1.

As best seen in FIGS. 2 and 3, the docking rack 40 is provided with profiles, rails or other suitably shaped guides 41 to guide the air conditioning modules 51-53 into and out of their respective docking positions P in the docking rack 40. The guides 41 as shown extend in the lateral direction T, thereby facilitating the insertion of the air conditioning modules 51-53 in an insertion direction A parallel to said lateral direction T and/or perpendicular to said stacking direction S. The air conditioning modules 51-53 are individually insertable into and removable from a respective one of the docking positions P in the insertion direction A and a removing direction B, respectively. In this exemplary embodiment, the removing direction B is opposite to the insertion direction A. In other words, the air conditioning modules 51-53 can be inserted and removed from the same side of the docking rack 40. In particular, the air conditioning modules 51-53 are insertable into and removable from the docking rack 40 through an opening in the housing 30 when the access panel 35 is removed.

Figure 5:
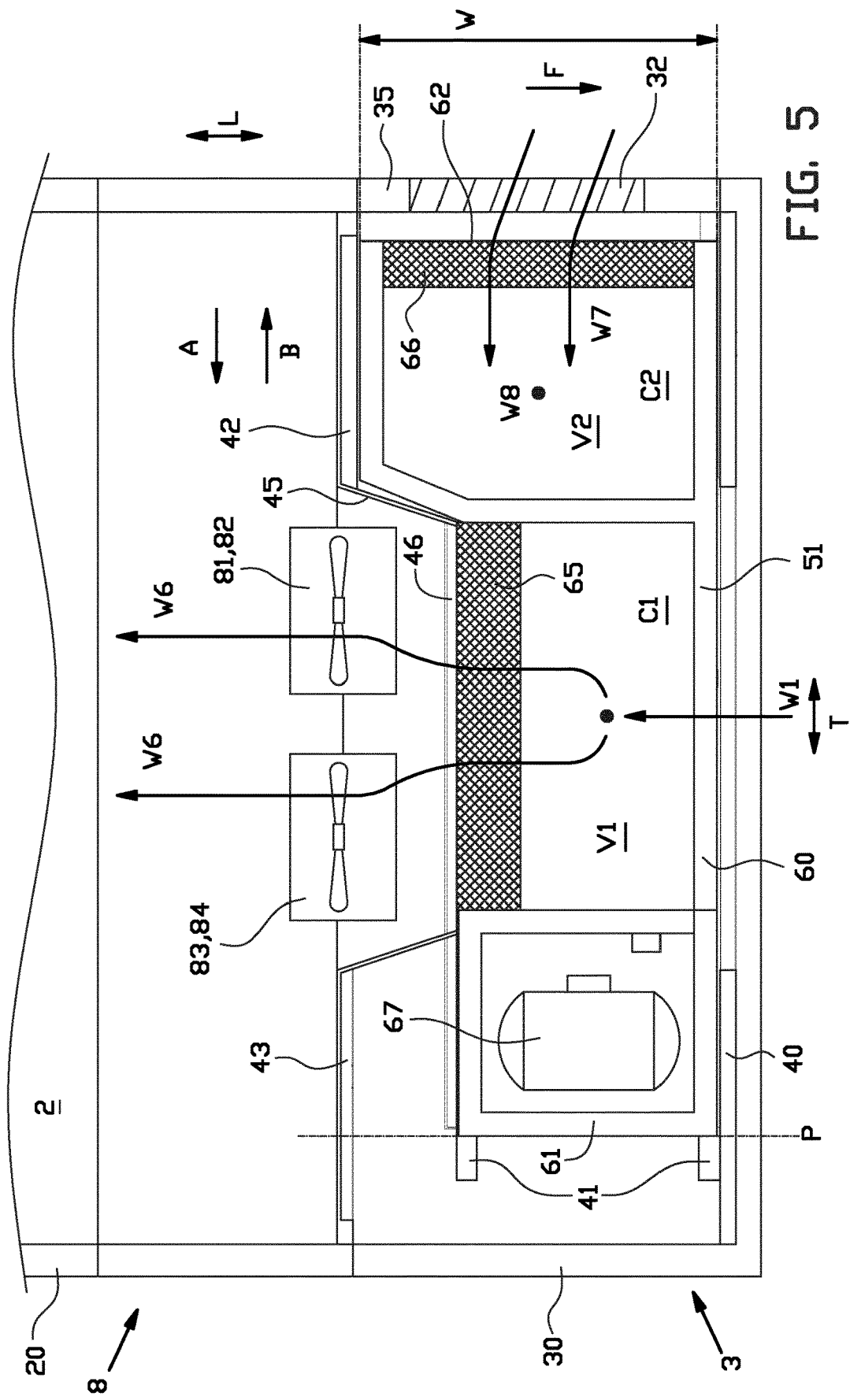

As shown in FIG. 5 the docking rack comprises one or more walls 42, 43 that at the respective levels L1-L3 complement the one or more air conditioning modules 51-53 in the docking positions P.

Figure 6:
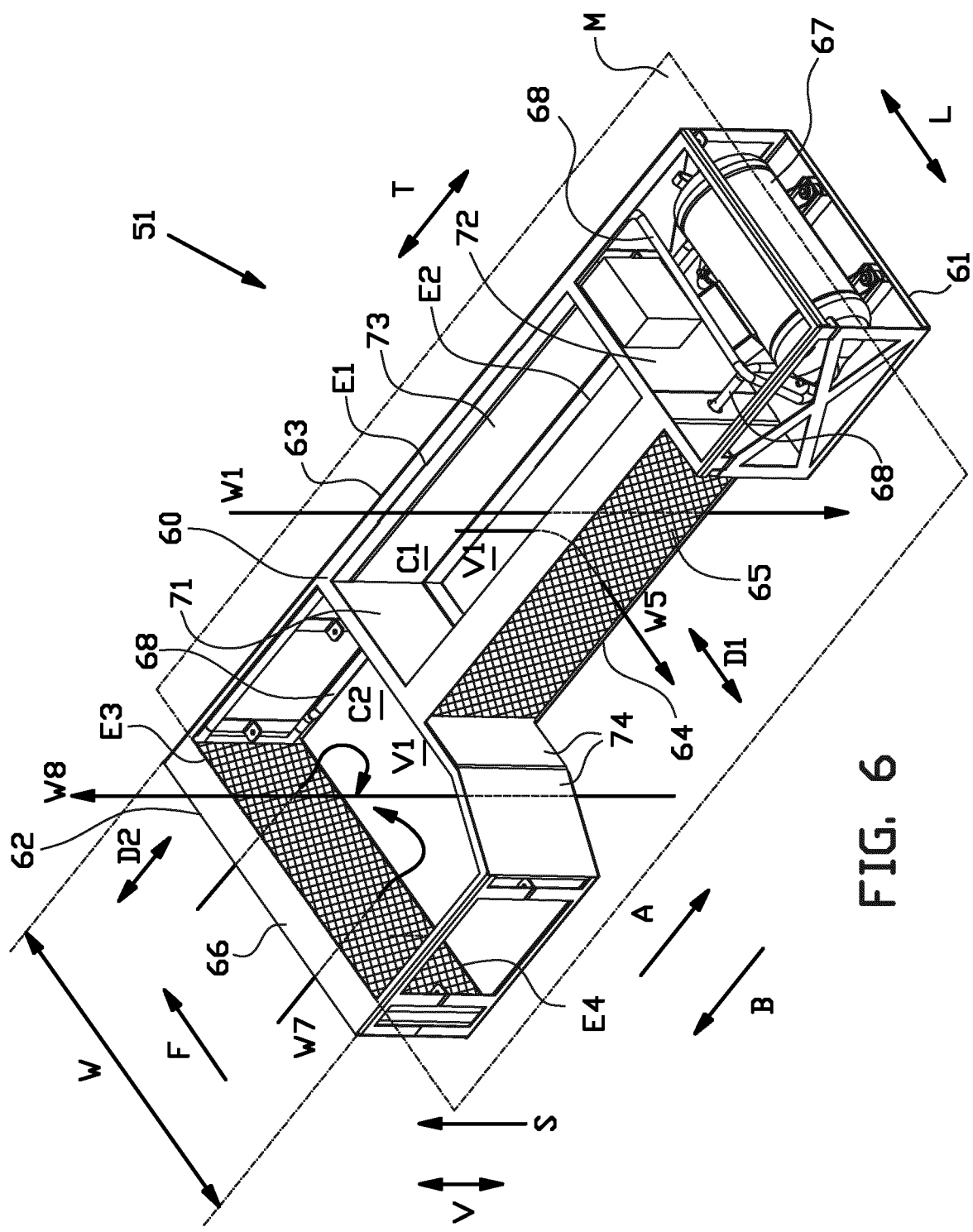
FIG. 6 shows an isometric view of an air conditioning module for use in the modular air conditioning system of FIG. 2.

FIG. 6 shows one of the air conditioning modules 51. Said air conditioning module 51 is representative of the other air conditioning modules 52, 53. In fact, the air condition modules 51, 52, 53 may all have the same or substantially the same structural and/or technical features, or may be identical. The description of features of the air conditioning module 51 below thus equally applies to the other air conditioning modules 52, 53.

As shown in FIG. 6, the air conditioning module 51 comprises a frame 60 with a first end 61 facing in the insertion direction A and a second end 62 opposite to the first end 61, i.e. facing in the removing direction B. The frame 60 further has a top 63 and a bottom 64 opposite to the top 63 in the stacking direction S. The frame 60 extends in a module plane M perpendicular to the stacking direction S and has a perimeter in said module plane M. In this exemplary embodiment, the frame 60 has a width W in a width direction perpendicular to the insertion direction A and the stacking direction S that is largest at the second end 62 and equal or smaller in the rest of the air conditioning module 51 from the second end 62 towards the first end 61. Hence, the air conditioning module 51 can be inserted into the docking rack 40, as shown in FIG. 2, through an opening in the housing 30 of the modular air conditioning system 3 that is at least equal in width to the width W of the air conditioning module 51.

As further shown in FIG. 6, the air conditioning module 51 comprises an evaporator 65, a condenser 66 and a compressor 67 which are mounted to, onto or in the frame 60. The evaporator 65, the condenser 66 and the compressor 67 are interconnected, i.e. by tubing, pipes or conduits 68, in a manner known per se to form a closed circuit for a heat exchange fluid. As best seen in FIG. 3, the air conditioning module 51 further comprises one or more connectors 69 for connection to the electrical power source 9 and/or the control unit 10 external to the air conditioning module 51. Said one or more connectors 69 are preferably located at the first end 61 of the frame 60, facing in the insertion direction A. The docking rack 40 comprises one or more connectors 44 at each level L1-L3, which are arranged to connect with the one or more connectors 69 of the air conditioning module 51. Preferably, said one or more connectors 44 of the docking rack 40 face in the removal direction B and are arranged to be connected automatically to the one or more connectors 69 at a respective one of the levels L1-L3 when the respective air conditioning module 51 is docked in the docking position P at said one level L1-L3. Alternatively, the connectors 44, 69 may be connected manually.

The frame 60 further defines or bounds a first volume V1 that is arranged in air communication with the evaporator 65 and a second volume V2 that is arranged in air communication with the condenser 66. The second volume V2 is separated from the first volume V1, at least in the lateral direction T. Moreover, the compressor 67 is preferably located outside of both the first volume V1 and the second volume V2. The frame 60 is provided with one or more walls 71, 72, 73, 74 to at least partially define or bound the first volume V1 and the second volume V2.

As best seen in FIG. 6, the frame 60 is provided with a first opening E1 and a second opening E2 in the stacking direction S on opposite sides of the first volume V1. As such, the first volume V1 of the air conditioning module 51, when docked in the docking rack 40, as shown in FIG. 4, can form a part of a common or continuous first air channel C1 extending in the stacking direction S into the frame 60 through the first opening E1 and out of the frame 60 through the second opening E2 without passing through the evaporator 65. In particular, when two or more air conditioning modules 51, 52, 53 are docked in their respective docking positions P in the docking rack 40, as shown in FIG. 3, their first volumes V1 are aligned in the stacking direction S to form the continuous first air channel C1.

Similarly, the frame 60 is provided with a third opening E3 and a fourth opening E4 in the stacking direction S on opposite sides of the second volume V2. In this way, also the second volume V2 of the air conditioning module 51, when docked in the docking rack 40, can form a part of a continuous second air channel C2 extending in the stacking direction S into the frame 60 through the third opening E3 and out of the frame 60 through the fourth opening E4 without passing through the condenser 66. In particular, when two or more air conditioning modules 51, 52, 53 are docked in their respective docking positions P in the docking rack 40, as shown in FIG. 3, their second volumes V2 are aligned in the stacking direction S to form the continuous second air channel C2.

In this exemplary embodiment, the second opening E2 is a projection of the first opening E1 in or parallel to the stacking direction S and/or the fourth opening E4 is a projection of the third opening E3 in or parallel to the stacking direction S. Preferably, also the first volume V1 has a constant or substantially constant cross section that in the stacking direction S is a projection of the first opening E1 and/or the second volume V2 has a constant or substantially constant cross section that in the stacking direction S is a projection of the third opening E3. Hence, air can flow in the stacking direction S through the first volume V1 and the second volume V2, respectively, without any substantial resistance.

When talking about the continuous air channels C1, C2 passing through the frame 60 without passing through the evaporator 65 and the condenser 66, what is meant is that said evaporator 65 and said condenser 66 do not block the continuous air channels C1, C2. In particular, the evaporator 65 is mounted to the frame 60 at a side of the first volume V1 in a first branch-off direction D1 perpendicular to the stacking direction S and/or the condenser 66 is mounted to the frame 60 at a side of the second volume V2 in a second branch-off direction D2 perpendicular to the stacking direction S. The evaporator and the condenser 66 are air permeable in the first branch-off direction D1 and the second branch-off direction D2, respectively. In this exemplary embodiment, the second branch-off direction D2 is different from the first branch-off direction D1. In particular, the second branch-off direction D2 is perpendicular to the first branch-off direction D1. Hence, the evaporator 65 and the condenser 66 are able to draw air from or supply air to the respective continuous air channel C1, C2, without intersecting with said continuous air channel C1, C2, as shown schematically with air flow arrows W5 and W7, respectively.

As shown in FIG. 6, the first opening E1 is located in, at or near the top 63 of the frame 60 and the second opening E2 is located in, at or near the bottom 64 of the frame 60. The top 63 and the bottom 64 are parallel or substantially parallel at the location of the first opening E1 and the second opening E2, respectively. Similarly, the third opening E3 and the fourth opening E4 are located in, at or near the top 63 and the bottom 64, respectively, and said top 63 and bottom 64 are also parallel or substantially parallel at the location of the third opening E3 and the fourth opening E4. Consequently, the similar or identical air conditioning modules 51, 52, 53, as shown in FIG. 3, can be easily stacked closely on top of each other in the stacking direction S so that the respective openings E1-E4 are congruent.

As best seen in FIG. 6, the first volume V1 and the second volume V2 are adjacent to each other in the lateral direction T and/or the insertion direction A. The one or more walls 71-74 of the frame 60 comprises a first separation wall 71 extending between the first volume V1 and the second volume V2 in said lateral direction T. The first volume V1 and the compressor 67 are adjacent to each other at a side of the first volume V1 in the lateral direction T opposite to the first separation wall 71. At that side, the one or more walls 71-74 comprises a second separation wall 72 extending between the first volume V1 and the compressor 67. Both walls extend from the bottom 64 towards and/or up to the top 63 of the frame 60, or from the first opening E1 towards and/or up to the second opening E2. Hence, the separation walls 71, 72 of two or more stacked air conditioning modules 51, 52, 53, as shown in FIG. 3, can be substantially continuous in the stacking direction S.

In this exemplary embodiment, the one or more walls 71-74 comprises a first outer wall 73 that defines or bounds the first volume V1 at a side of said first volume V1 opposite to the evaporator 65. Hence, the two separation walls 71, 72 and the first outer wall 73, together with the evaporator 65, form a first air chamber that encloses the first volume V1 in all directions but the stacking direction S. The first outer wall 73 may be removable from or hingably mounted to the frame 60 from the air conditioning module 51 to allow for cleaning of the evaporator 65 and the first volume V1.

Figure 7:
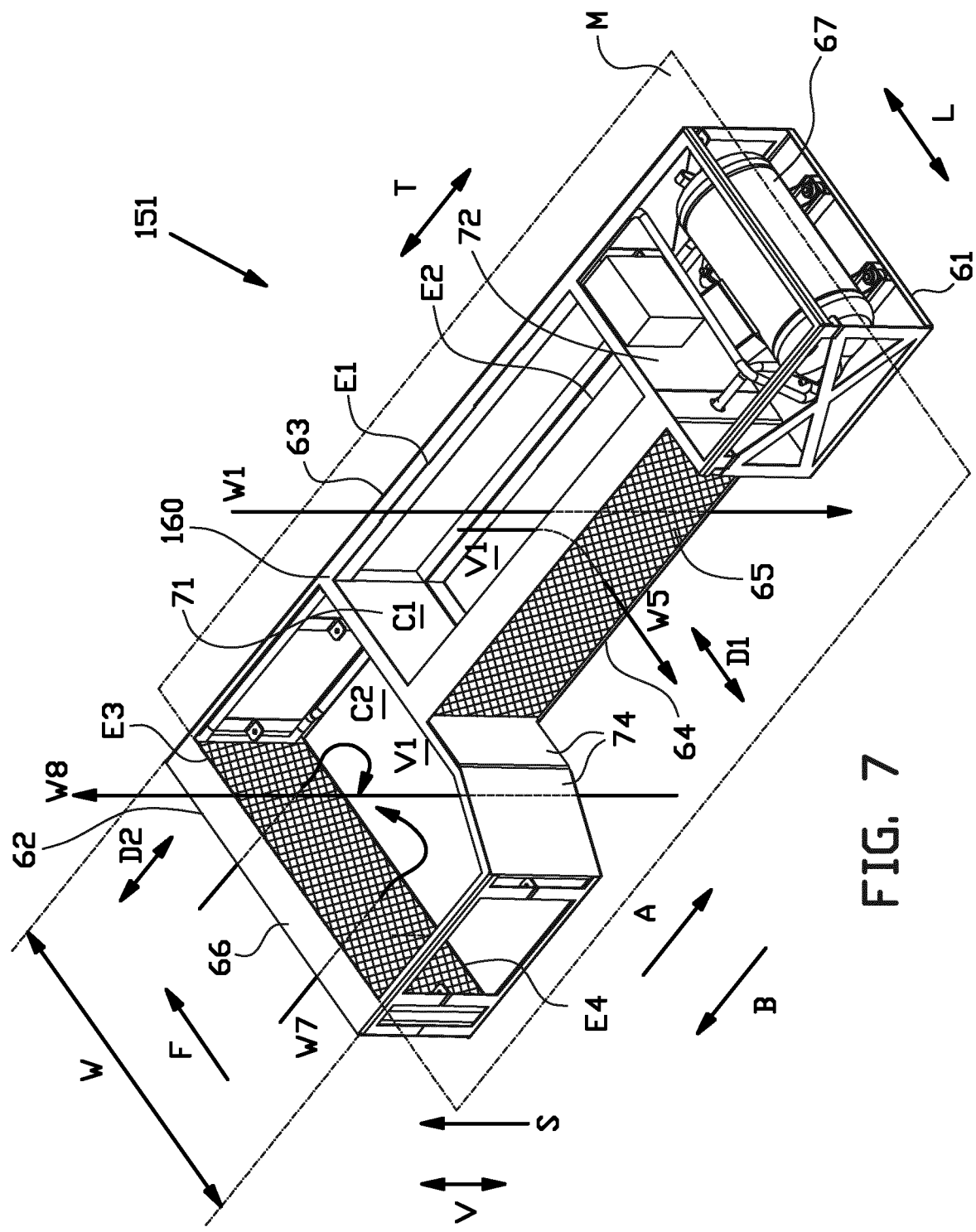
FIG. 7 shows an isometric view of an alternative air conditioning module according to a second embodiment of the invention.

FIG. 7 shows an alternative air conditioning module 151 that differs from the aforementioned air conditioning module 51 in that it does not have walls where the first volume V1 adjoins the perimeter in the module plane M. In other words, the frame 60 only defines or bounds the first volume V1 in the lateral direction T. In that case, the one or more walls 42, 43 of the docking rack 40, as shown in FIG. 2, may extend closely along the side of the frame 60 where the first volume V1 adjoins the perimeter of said frame 60 at the respective level L1-L3 to complement the alternative air conditioning module 151 and to at least partially define the first volume V1 together with the separation walls 71, 72 of the alternative air conditioning module 151.

Figure 8:
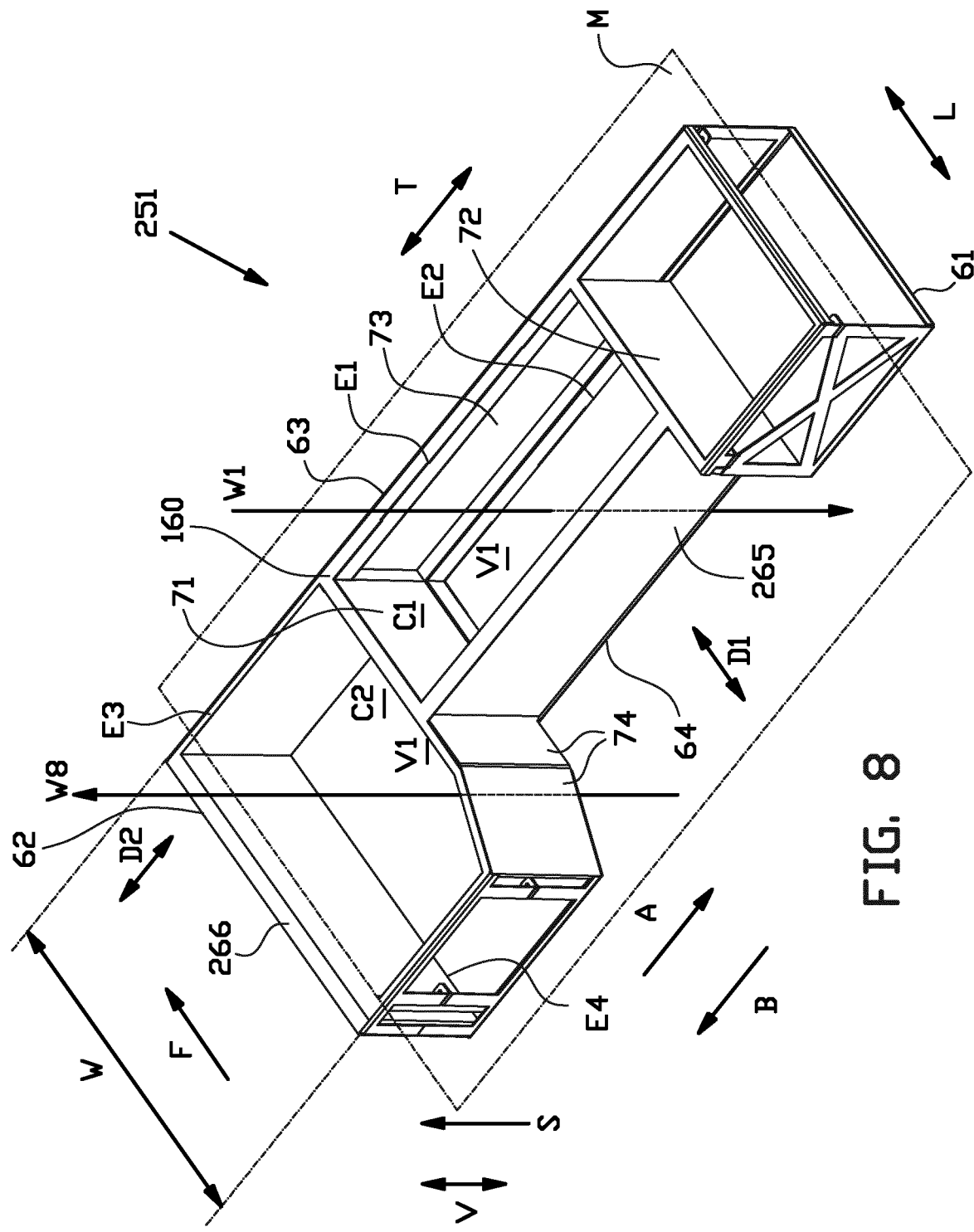
FIG. 8 shows an isometric view of a dummy module to replace one of the air conditioning modules according to the invention.

FIG. 8 shows a dummy module 251 to replace one of the aforementioned air conditioning modules 51-53, 151. The dummy module 251, like the air conditioning modules 51-53, 151, has a frame 260 that defines a first volume V201 and a second volume V202 that, when the dummy module 251 replaces one of the air conditioning modules 51-53, 151, are in the same position as the first volume V1 and the second volume V2, respectively, of the air conditioning module 51-53, 151. In fact, the dummy module 251 may have substantially the same or an identical frame 260 to the frame 60 of the air conditioning modules 51-53, 151. Hence, the dummy module 251 can be inserted into and removed from the docking rack 40 in substantially the same way as the air conditioning modules 51-53, 151. The dummy module 251 differs from the previously discussed air conditioning modules 51-53, 151 in that it comprises a first air barrier 265 which, when the dummy module 251 replaces one of the air conditioning modules 51-53, 151, is in the same position as the evaporator 65 of the respective air conditioning module 51-53, 151. The dummy module 251 further comprises a second air barrier 266 which, when the dummy module 251 replaces one of the air conditioning modules, is in the same position as the condenser 66 of the respective air conditioning module 51-53, 151. Said dummy module 251 can be used to maintain the continuous air channels C1, C2, at a level L1-L3 of the docking rack 40, as shown in FIG. 2, where one of the air conditioning modules 51-53, 151 is missing.

The air barriers 265, 266 may be impermeable to air, i.e. a closed wall. Alternatively, the air barriers 265, 266 may provide air resistance equal or substantially equal to the air resistance experienced when air flows through the evaporator 65 or the condenser 66, i.e. by providing a perforated wall.

The air conditioning modules 51, 151 can be provided as a set with one or more dummy modules 251 to allow for flexibility in the amount of air conditioning modules 51-53, 151 that is actually mounted in the docking rack 40. The control unit 10 is arranged for automatically recognizing when one of the air conditioning modules 51, 151 is docked at a respective one of the levels L1-L3 of the docking rack 40 and can adjust the operation of the modular air conditioning system 3 accordingly, i.e. by operating two or more of the air conditioning modules 51 in parallel or redundantly. When a dummy module 251 is docked, at least a part of the recirculated air flow (shown schematically in FIG. 4 with air flow arrow W4) may be directed back into the compartment 2 without passing through the modular air conditioning system 3 by opening the bypass selector 38.

As shown in FIG. 4, the continuous first air channel C1 can draw air from the air supply section 36, which in this example is located on top of the docking rack 40. The air supply section 36 may alternatively be located at the bottom of the docking rack 40. Said air can be fresh or ambient air drawn into the air supply section 36 through the air inlet 31 associated with said air supply section 36 (shown schematically with air flow arrow W1), used air recirculated through the recirculation channel 21 into the air supply section 36 (shown schematically with air flow arrow W2) or a mixture thereof. In particular, the air flow selector 37 of the air supply section 36 is movable between a discharge position G1 in which airflow W2 is directed through the one air outlet 33 and a recirculation position G2 in which the airflow W2 is at least partially directed into the continuous first air channel C1.

Figure 9:
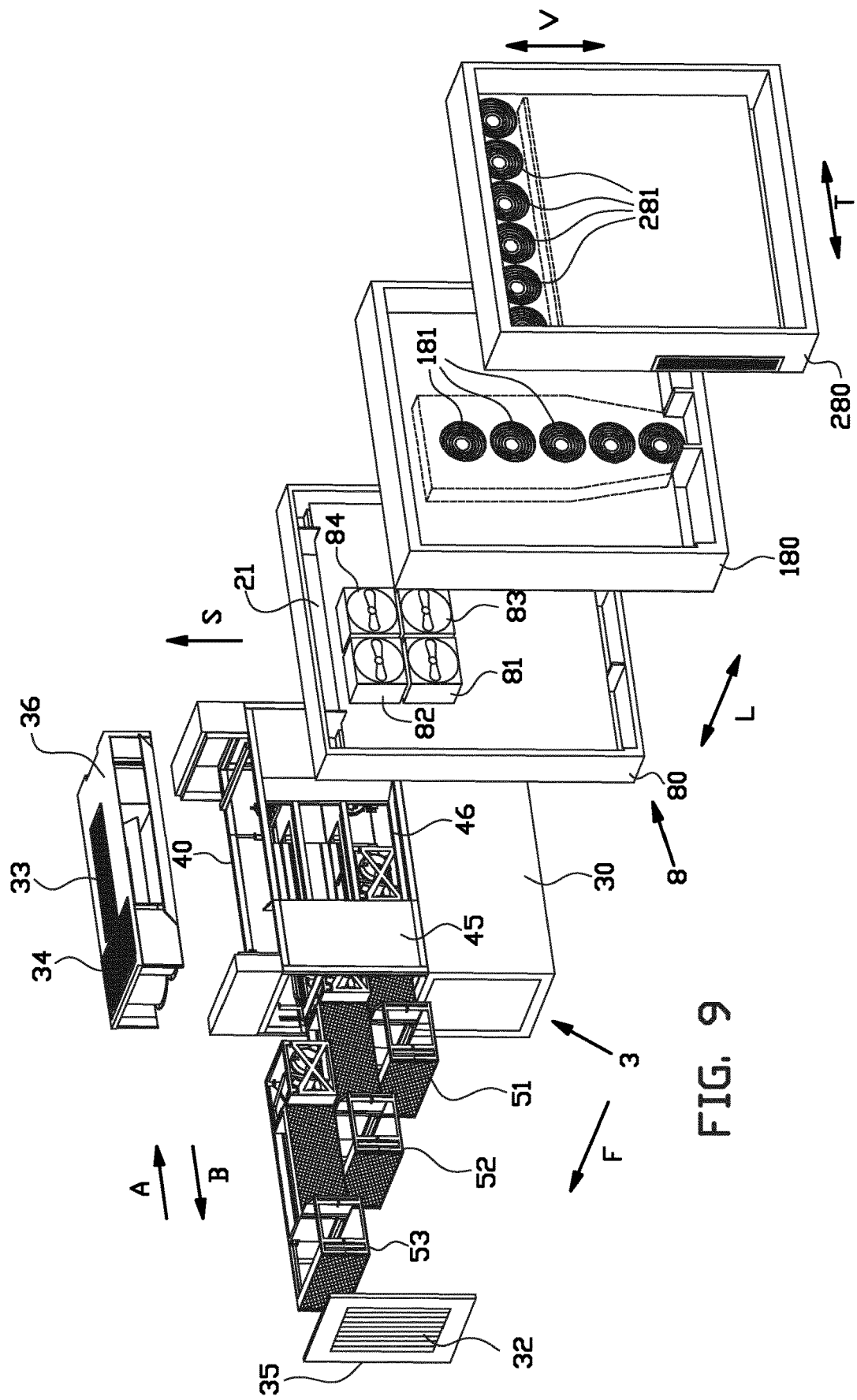
FIG. 9 shows an exploded view of the modular air conditioning system according to FIG. 2 and three different air distribution cabinets for use in combination with said air conditioning system.

As best seen in FIG. 9, the docking rack 40 has an output side 45 for connecting the one or more air conditioning modules to the air distribution section 8. The output side 45 is provided with one or more output openings 46. Said one or more output openings 46 are arranged to be in air communication with the air distribution section 8 and with the evaporators 65 of the one or more air conditioning modules 51-53 from a side of the respective evaporators 65 opposite to the respective first volumes V1. As shown in FIGS. 4 and 5, the air distribution section 8 comprises an air distribution cabinet 80 to distribute air (schematically shown with air flow arrow W6) from the modular air conditioning system 3 into the compartment 2. In this exemplary embodiment, the air distribution cabinet 80 comprises four fans 81-84 to draw the air from the continuous first air channel C1 through the air distribution cabinet 80 and into the compartment 2. However, many variations of the air distribution cabinet 80 are within the scope of the current invention.

In particular, it envisioned that the air distribution section 8 allows for interchangeably mounting said air distribution cabinet 80. FIG. 9 shows two alternative air distribution cabinets 180, 280, each with their own configuration of fans 181, 281, walls and/or chambers to generate the optimum air distribution for the compartment 2. Each of the air distribution cabinets 80, 180, 280 can be mounted at the location of the air distribution section 8 between the modular air conditioning system 3 and the compartment 2.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. An air conditioning module comprising a frame and, mounted to said frame, an evaporator, a condenser and a compressor which are interconnected to form a closed circuit for a heat exchange fluid, wherein the frame further defines a first volume arranged in air communication with the evaporator and a second volume, separate from the first volume, arranged in air communication with the condenser, wherein the frame is provided with a first opening and a second opening in a stacking direction on opposite sides of the first volume, wherein the first volume forms a part of a continuous first air channel extending in the stacking direction into the frame through the first opening and out of the frame through the second opening without passing through the evaporator.

2. The air conditioning module according to claim 1, wherein the second opening is a projection of the first opening in a direction parallel to the stacking direction.

3. The air conditioning module according to claim 1, wherein the frame has a top and a bottom opposite to the top in the stacking direction, wherein the first opening is located in the top of the frame and the second opening is located in the bottom of the frame, wherein the top and the bottom are parallel at the location of the first opening and the second opening, respectively.

4. The air conditioning module according to claim 1, wherein the evaporator is mounted to the frame at a side of the first volume in a first branch-off direction perpendicular to the stacking direction.

5. The air conditioning module according to claim 1, wherein the frame is provided with one or more walls that extend from the first opening up to the second opening and that at least partially define the first volume in one or more directions different from the first branch-off direction and the stacking direction.

6. The air conditioning module according to claim 5, wherein the first volume and the second volume are adjacent to each other in a lateral direction perpendicular to the stacking direction, wherein the one or more walls comprises a first separation wall extending between the first volume and the second volume in said lateral direction.

7. The air conditioning module according to claim 6, wherein the first volume and the compressor are adjacent to each other at a side of the first volume in the lateral direction opposite to the first separation wall, wherein the one or more walls comprises a second separation wall extending between the first volume and the compressor.

8. The air conditioning module according to claim 5, wherein the frame extends in a module plane perpendicular to the stacking direction and has a perimeter in said module plane, wherein the one or more walls comprises one or more separation walls extending at least at the sides of the first volume that do not adjoin with the perimeter in the module plane.

9. The air conditioning module according to claim 5, wherein the one or more walls and the evaporator together form a first air chamber that encloses the first volume in all directions but the stacking direction.

10. The air conditioning module according to claim 1, wherein the frame is provided with a third opening and a fourth opening in the stacking direction on opposite sides of the second volume, wherein the second volume forms part of a continuous second air channel extending in the stacking direction into the frame through the third opening and out of the frame through the fourth opening without passing through the condenser.

11. The air conditioning module according to claim 10, wherein the condenser is mounted to the frame at a side of the second volume in a second branch-off direction perpendicular to the stacking direction.

12. The air conditioning module according to claim 1, wherein the air conditioning module comprises one or more connectors for connection to an electrical power source or a control unit external to the air conditioning module.

13. A set of an air conditioning modules according to claim 1 and a dummy module to replace said air conditioning module, wherein the dummy module comprises a frame that defines a first volume and a second volume which, when the dummy module replaces the air conditioning module, are in the same position as the first volume and the second volume, respectively, of the air conditioning module, wherein the dummy module further comprises a first air barrier which, when the dummy module replaces the air conditioning module, is in the same position as the evaporator.

14. The set according to claim 13, wherein the dummy module further comprises a second air barrier which, when the dummy module replaces the air conditioning module, is in the same position as the condenser.

15. A modular air conditioning system comprising one or more air conditioning modules according to claim 1 and a docking rack that defines a plurality of levels, wherein each level is arranged for docking one of the one or more air conditioning modules in a docking position in which the first volume of said one air conditioning module is arranged to be aligned in the stacking direction with the first volume of each air conditioning module received in the docking position at any other level to form the continuous first air channel.

16. The modular air conditioning system according to claim 15, wherein the second volume of said one air conditioning module in the docking position is arranged to be aligned in the stacking direction with the second volume of each air conditioning module received in the docking position at any other level to form a continuous second air channel.

17. The modular air conditioning system according to claim 15, wherein the plurality of levels comprises at least three levels.

18. The modular air conditioning system according to claim 15, wherein each air conditioning module is individually insertable into and removable from a respective one of the docking positions in an insertion direction and a removing direction, respectively.

19. The modular air conditioning system according to claim 18, wherein the insertion direction and the removing direction are perpendicular to the stacking direction.

20. The modular air conditioning system according to claim 18, wherein the removing direction is opposite to the insertion direction.

21. The modular air conditioning system according to claim 20, wherein each air conditioning module has a first end facing in the insertion direction and a second end facing in the removing direction, wherein each air conditioning module further has a width in a width direction perpendicular to the insertion direction and the stacking direction that is largest at the second end and equal or smaller in the rest of the air conditioning module from the second end towards the first end.

22. The modular air conditioning system according to claim 15, wherein the docking rack comprises one or more walls that at the respective levels complement the one or more air conditioning modules in the docking positions to at least partially define the first volumes and/or the second volumes thereof.

23. The modular air conditioning system according to claim 15, wherein the docking rack has an output side for connecting the one or more air conditioning modules to an air distribution section, wherein the output side is provided with one or more output openings which are arranged to be in air communication with the air distribution section and with the evaporators of the one or more air conditioning modules from a side of the respective evaporators opposite to the respective first volumes.

24. The modular air conditioning system according to claim 15, wherein the docking rack comprises one or more connectors at each level, wherein each air conditioning module comprises one or more connectors that are arranged to be connected automatically to the one or more connectors at a respective one of the levels when the respective air conditioning module is docked in the docking position at said one level.

25. The modular air conditioning system according to claim 15, wherein the modular air conditioning system further comprises a control unit that is connectable to the one or more air conditioning modules when the one or more air condition modules are docked at one of the levels of the docking rack to control the operation of said one or more air conditioning modules.

26. The modular air conditioning system according to claim 25, wherein the control unit is arranged for controlling the one or more air conditioning modules in parallel, redundantly or a combination thereof when two or more air condition modules are docked to the docking rack at the same time.

27. A transport vehicle comprising a modular air conditioning system according to claim 15 and a compartment to be conditioned by said modular air conditioning system.

28. The transport vehicle according to claim 27, wherein the transport vehicle further comprises an air supply section that is arranged in air communication with the continuous first air channel for supplying air to said continuous first air channel, wherein the air supply section is provided with an air inlet to take in ambient air from outside of the transport vehicle, an air outlet to discharge air out of the transport vehicle and a recirculation channel that is arranged in air communication with the compartment, wherein the air supply section further comprises an air flow selector that is movable between a discharge position in which air recirculated through the recirculation channel into the air supply section is directed through the air outlet and a recirculation position in which the air recirculated through the recirculation channel into the air supply section is at least partially directed into the continuous first air channel.

29. The transport vehicle according to claim 27, wherein the transport vehicle further comprises an air distribution section between the modular air conditioning system and the compartment and an air distribution cabinet mounted in said air distribution section to distribute air from the modular air conditioning system into the compartment, wherein the air distribution cabinet is interchangeable with one or more alternative air distribution cabinets.

30. The transport vehicle according to claim 27, wherein the transport vehicle is a truck or a trailer for transporting livestock.

31. A method for conditioning air in a transport vehicle, wherein the method comprises the steps of:
providing a transport vehicle comprising a modular air conditioning system and a compartment to be conditioned by said modular air conditioning system,
wherein the modular air conditioning system comprises one or more air conditioning modules and a docking rack that defines a plurality of levels,
wherein the one or more air conditioning modules comprise a frame, and mounted to said frame, an evaporator, a condenser and a compressor which are interconnected to form a closed circuit for a heat exchange fluid,
wherein the frame further defines a first volume arranged in air communication with the evaporator and a second volume, separate from the first volume, arranged in air communication with the condenser, wherein the frame is provided with a first opening and a second opening in a stacking direction on opposite sides of the first volume,
wherein the first volume forms a part of a continuous first air channel extending in the stacking direction into the frame through the first opening and out of the frame through the second opening without passing through the evaporator,
wherein each level is arranged for docking one of the one or more air conditioning modules in a docking position in which the first volume of said one air conditioning module is arranged to be aligned in the stacking direction with the first volume of each air conditioning module received in the docking position at any other level to form the continuous first air channel;
docking one of the one or more air conditioning modules in the docking position of a respective one of the levels;
docking a further one of the one or more air conditioning modules in the docking position of any other one of the levels; and
forming the continuous first air channel with the first volumes of said one air conditioning module and said further air conditioning module.

32. The method according to claim 31, wherein the method further comprises the step of replacing one or more of the one or more air conditioning modules with a dummy module, wherein the dummy module comprises a dummy frame that defines a first volume and a second volume which, when the dummy module replaces the air conditioning module, are in the same position as the first volume and the second volume, respectively, of the air conditioning module, wherein the dummy module further comprises a first air barrier which, when the dummy module replaces the air conditioning module, is in the same position as the evaporator.

33. The method according to claim 31, wherein the method further comprises the step of controlling the one or more air conditioning modules in parallel, redundantly or a combination thereof when two or more air condition modules are docked to the docking rack at the same time.

* * * * *